US011544597B2

(12) United States Patent
Cornelio et al.

(10) Patent No.: US 11,544,597 B2
(45) Date of Patent: Jan. 3, 2023

(54) PROBLEM MANIPULATORS FOR LANGUAGE-INDEPENDENT COMPUTERIZED REASONING

(71) Applicant: INTERNATIONAL BUSINESS MACHINES CORPORATION, Armonk, NY (US)

(72) Inventors: Cristina Cornelio, Yorktown Heights, NY (US); Achille Belly Fokoue-Nkoutche, White Plains, NY (US); Ibrahim Abdelaziz, Tarrytown, NY (US); Aldo Pareja, Cambridge, MA (US); Michael John Witbrock, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 322 days.

(21) Appl. No.: 16/864,090

(22) Filed: Apr. 30, 2020

(65) Prior Publication Data

US 2021/0342710 A1  Nov. 4, 2021

(51) Int. Cl.
*G06F 16/2453* (2019.01)
*G06N 5/04* (2006.01)
(Continued)

(52) U.S. Cl.
CPC ........... *G06N 5/04* (2013.01); *G06F 16/2246* (2019.01); *G06F 16/248* (2019.01);
(Continued)

(58) Field of Classification Search
CPC ............. G06F 16/2246; G06F 16/3329; G06F 16/24535; G06F 16/248; H04L 51/02
See application file for complete search history.

(56) References Cited

U.S. PATENT DOCUMENTS

| 7,949,624 B2 | 5/2011 | Kelly et al. |
| 8,418,101 B1 | 4/2013 | Kuehlmann et al. |
| (Continued) | | |

FOREIGN PATENT DOCUMENTS

| CN | 110046265 A | 7/2019 |
| CN | 110287392 A | 7/2019 |
| CN | 110704453 A | 1/2020 |

OTHER PUBLICATIONS

Besold, T. R. et al., "Neural-Symbolic Learning and Reasoning: ;A Survey and Interpretation"; arXiv:1711.03902v1 [cs.AI] (2017); 58 pgs.
(Continued)

*Primary Examiner* — Huawen A Peng
(74) *Attorney, Agent, or Firm* — Intelletek Law Group, PLLC; Gabriel Daniel, Esq.

(57) ABSTRACT

A method of improving computing efficiency of a computing device for language-independent problem solving and reasoning includes receiving a query from a user, which is decomposed into one or more sub-queries arranged according to a tree structure. The one or more sub-queries are executed in a knowledge base. The results of the executed one or more sub-queries are received and composed into a query response. The query response is transmitted to the user.

17 Claims, 5 Drawing Sheets

(51) Int. Cl.
| | |
|---|---|
| G06N 5/02 | (2006.01) |
| G06F 16/248 | (2019.01) |
| G06F 16/22 | (2019.01) |
| G06N 20/00 | (2019.01) |
| G06F 16/332 | (2019.01) |

(52) U.S. Cl.
CPC .... *G06F 16/24535* (2019.01); *G06F 16/3329* (2019.01); *G06N 5/02* (2013.01); *G06N 20/00* (2019.01)

(56) References Cited

U.S. PATENT DOCUMENTS

| | | | | |
|---|---|---|---|---|
| 9,195,744 | B2* | 11/2015 | Adachi | G06F 16/24535 |
| 2005/0097450 | A1 | 5/2005 | Lumera et al. | |
| 2011/0082859 | A1* | 4/2011 | Deng | G06F 16/285 707/769 |
| 2016/0147770 | A1* | 5/2016 | Deng | G06F 16/24535 707/708 |
| 2017/0011023 | A1* | 1/2017 | Ghannam | G06F 40/205 |
| 2018/0336198 | A1 | 11/2018 | Zhong et al. | |
| 2019/0050452 | A1 | 2/2019 | Milroy et al. | |
| 2019/0108455 | A1 | 4/2019 | Buyanovskiy | |
| 2021/0073474 | A1* | 3/2021 | Sengupta | H04L 51/02 |

OTHER PUBLICATIONS

Quinlan, J.R., "Learning Logical Definitions from Relations"; Machine Learning (1990); vol. 5; pp. 239-266.
Galarraga, L. et al., "Fast Rule Mining in Ontological Knowledge Bases with AMIE"; The VLDB Journal (2015); 26 pgs.
Omran, P. G. et al., "Scalable Rule Learning via Learning Representation"; Proceedings of the Twenty-Seventh International Joint Conference on Artificial Intelligence (2018); pp. 2149-2155.
Minervini, P. et al., "Towards Neural Theorem Proving at Scale"; arXiv:1807.08204v1 [cs.AI] (2018); 6 pgs.
Evans, R. et al., "Learning Explanatory Rules from Noisy Data"; Journal of Artificial Intelligence (2017); 64 pgs.
Ho, V.T., et al., "Rule Learning from Knowledge Graphs Guided by Embedding Models"; Max Planck Institute for Informatics (2018); 16 pgs.
Azad, H.K. et al., "Query Expansion Techniques for Information Retrieval: a Survey"; arXiv:1708.00247v2 [cs.IR] (2019); 49 pgs.
Chen, Q. et al., "Neural Natural Language Inference Models Enhanced with External Knowledge"; Proceedings of the 56th Annual Meeting of the Association for Computational Linguistics (Long Papers—2018); pp. 2406-2417.
Glockner, M. et al., "Breaking NLI Systems with Sentences that Require Simple Lexical Inferences"; Proceedings of the 56th Annual Meeting of the Association for Computational Linguistics (Short Papers—2018); pp. 650-655.
Maron, M.E., et al., "On Relevance, Probabilistic Indexing and Information Retrieval"; Rightslink (1960); 29 pgs.
Musa, R. et al., "Answering Science Exam Questions Using Query Reformulation with Background Knowledge"; arXiv:1809.05726v2 [cs.AI] (2019); 17 pgs.
Rocchio, J.J., "Relevance Feedback in Information Retrieval" The Smart Retrieval System (1965); 18 pgs.
Unger, C. et al., "Question Answering over Linked Data (QALD-4)" CITEC (2014); 9 pgs.
Wang, S., et al., "Learning Natural Language Inference with LSTM"; arXiv:1512.08849v2 [cs.CL] (2016); 10 pgs.
Yin, W. et al., "End-Task Oriented Textual Entailment via Deep Explorations of Inter-Sentence Interactions"; arXiv:1804.08813v3 [cs.CL] (2018); 6 pgs.
Chen, K. et al., "ABC-CNN: An Attention Based Convolutional Neural Network for Visual Question Answering"; arXiv:1511.05960v2 [cs.CV] (2016); 10 pgs.
Venugopalan, S. et al., "Sequence to Sequence—Video to Text"; arXiv:1505.00487v3 [cs.CV] (2015); 9 pgs.
Ganju, S., et al., "What's in a Question: Using Visual Questions as a Form of Supervision"; arXiv:1704.03895v1 [cs.CV] (2017); 12 pgs.
Johnson, J. et al., "CLEVR: A Diagnostic Dataset for Compositional Language and Elementary Visual Reasoning"; arXiv:1612.06890v1 [cs.CV] (2016); 17 pgs.
Kiros, R. et al., "Unifying Visual-Semantic Embeddings with Multimodal Neural Language Models";arXiv:1411.2539v1 [cs.LG] (2014); 13 pgs.
Malinowski, M., et al., "Ask Your Neurons: A Deep Learning Approach to Visual Question Answering"; arXiv:1605.02697v2 [cs.CV] (2016); 27 pgs.
Mao, J. et al., "The Neuro-Symbolic Concept Learner: Interpreting Scenes, Words, and Sentences From Natural Supervision"; arXiv:1904.12584v1 [cs.CV]; (2019); 28 pgs.
Vendrov, I. et al., "Order-Embeddings of Images and Language"; arXiv:1511.06361v6 [cs.LG] (2016); 12 pgs.
Xu, H. et al., "Ask, Attend and Answer: Exploring Question-Guided Spatial Attention for Visual Question Answering"; arXiv:1511.05234v2 [cs.CV] (2016); 16 pgs.
Lu, J. et al., "Hierarchical Question-Image Co-Attention for Visual Question Answering"; arXiv:1606.00061v5 [cs.CV] (2019); 11 pgs.
Zhu, L. et al., "Uncovering Temporal Context for Video Question and Answering"; arXiv:1511.04670v1 [cs.CV] (2015); 10 pgs.
Kamath, S. et al., "Discovering Composable Web Services Using Functional Semantics and Service Dependencies Based on Natural Language Requests"; Information Systems Frontiers (2019); vol. 21:1; pp. 175-189.
Nihalani, N. et al., "Natural language Interface for Database: A Brief Review"; International Journal of Computer Science Issues (2011); vol. 8,:2; pp. 600-608.
Gardon, A. et al., "Towards an Intelligent Question-Answering System—State-of-the-art in the Artificial Mind"; In Proceedings of the 4th International Conference on Agents and Artificial Intelligence (ICAART—2012); 7 pgs.

* cited by examiner

PROBLEM MANIPULATORS FOR LANGUAGE-INDEPENDENT COMPUTERIZED REASONING

BACKGROUND

Technical Field

The present disclosure generally relates to computer systems and software for use therewith, and more particularly, to methods and systems for providing a generalized framework that can work independently from the language and the representation model of the input.

Description of the Related Art

Problem solving or reasoning is used by artificial agents to interact with a user. Existing solutions for problem solving within an artificial agent are specialized and tailored to a specific application domain. These application domains include, for example, reasoning over natural language text, logical inference and visual query answering. Reasoning on different input languages can be viewed as an instance of the same problem. Current systems that can handle any of the three targeted applications of natural languages, images and formal logic involve completely different computational methodologies for each of the separate application domains.

SUMMARY

According to various embodiments, a computing device, a non-transitory computer readable storage medium, and a method are provided for problem manipulation for language-independent reasoning and problem solving. The method may be applied to an artificial intelligent agent comprising a processor and a problem solving and reasoning engine. The problem solving and reasoning engine can receive a query from a user, decompose the query into two or more sub-queries arranged according to a tree structure, determine an answer to at least one of the two or more sub-queries in a knowledge base, receive results of the two or more sub-queries, assemble the results of the two or more sub-queries into a query response and transmit the query response to the user.

In one embodiment, the query received from the user is a natural language query.

In one embodiment, the problem solving and reasoning engine is configured to perform acts further including receiving a corpus of natural language into a memory of the artificial intelligent agent.

In one embodiment, the query response is transmitted to the user as a natural language response.

In one embodiment, the step of decomposing the query into one or more sub-queries is independent of a language of the query from the user.

In one embodiment, the tree structure is arranged as a disjunction of conjunctions of sub-queries.

In one embodiment, the problem solving and reasoning engine is configured to perform acts including further decomposing one of the one or more sub-queries when the results of the executed one of the one or more sub-queries returns with no answer.

In one embodiment, the problem solving and reasoning engine is configured to perform acts including repeating the further decomposing of one of the one or more sub-queries until an answer is found in the knowledge base.

In one embodiment, the problem solving and reasoning engine is configured to perform acts further including applying forward reasoning and backward reasoning to create the tree structure.

In one embodiment, the problem solving and reasoning engine is configured to perform acts further including learning a rule based on at least a portion of the tree structure.

According to various embodiments, a computing device, a non-transitory computer readable storage medium, and a method are provided for receiving a query from a user. The query can be decomposed into two or more sub-queries arranged according to a tree structure. The sub-queries can be executed in a knowledge base to determine an answer. The results two or more sub-queries can be received and composed a query response and the query response can be transmitted to the user. The steps of decomposing the query into one or more sub-queries, determining an answer of the two or more sub-queries in the knowledge base, receiving results of the executed one or more sub-queries and composing the results of the two or more sub-queries are independent of a language of the query from the user.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

Figure 1:
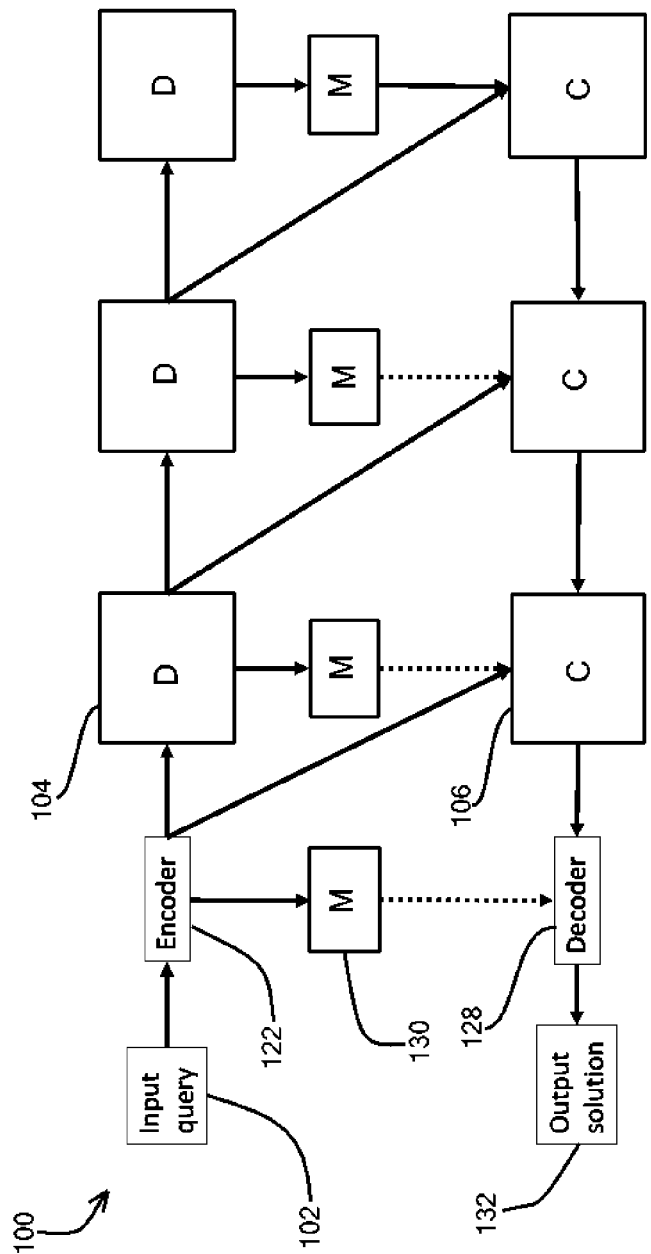
FIG. 1 is a schematic representation of a problem-solving process, showing the steps of encoding the input, decomposition, matching, composition, and decoding the answer, consistent with an illustrative embodiment.

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

The term "robot" or "agent" or "intelligent agent" or "artificial agent" or "artificial intelligent agent" may refer to any system controlled directly or indirectly by a computer or computing system that issues actions or commands in response to senses or observations. The term may refer without limitation to a traditional physical robot with physical sensors such as cameras, touch sensors, range sensors, and the like, or to a simulated robot that exists in a virtual simulation, or to a "bot" such as a mailbot or searchbot that exists as software in a network. It may without limitation refer to any limbed robots, walking robots, industrial robots (including but not limited to robots used for automation of assembly, painting, repair, maintenance, and the like), wheeled robots, vacuum-cleaning or lawn-mowing robots, personal assistant robots, service robots, medical or surgical robots, flying robots, driving robots, aircraft or spacecraft robots, or any other robots, vehicular or otherwise, real or simulated, operating under substantially autonomous control, including also stationary robots such as intelligent household or workplace appliances.

Many practical embodiments of the present disclosure provide for efficient performance of activities such as problem solving and reasoning by an artificial intelligent agent. As used herein, "problem solving" refers to the ability of an artificial agent to answer a query posed thereto. One example of "problem solving" may be, as described below, asking an artificial agent if there is an apple on the desk, where, through methods and techniques as provided in the present disclosure, the artificial agent can answer the query. The term "reasoning" refers to the decision process to determine the acts to be taken by the artificial agent, after receiving the query, to determine the answer to the query. Accordingly, "reasoning" is a part of "problem solving" for an artificial agent.

In some embodiments, a "sensor" may include, without limitation, any source of information about an agent's environment, and, more particularly, how a control may be directed toward reaching an end. In a non-limiting example, sensory information may come from any source, including, without limitation, sensory devices, such as cameras, touch sensors, range sensors, temperature sensors, wavelength sensors, sound or speech sensors, proprioceptive sensors, position sensors, pressure or force sensors, velocity or acceleration or other motion sensors, etc., or from compiled, abstract, or situational information (e.g., known position of an object in a space) which may be compiled from a collection of sensory devices combined with previously held information (e.g., regarding recent positions of an object), location information, location sensors, and the like.

The terms "observation" or "observations" refers to any information the agent receives about the agent's environment or itself. In some embodiments, that information may be sensory information or signals received through sensory devices, such as, without limitation, cameras, touch sensors, range sensors, temperature sensors, wavelength sensors, sound or speech sensors, position sensors, pressure or force sensors, velocity or acceleration or other motion sensors, location sensors (e.g., GPS), etc. In other embodiments the information the agent receives could also include without limitation compiled, abstract, or situational information compiled from a collection of sensory devices combined with stored information. In a non-limiting example, the agent may receive, as an observation, abstract information regarding the location or characteristics of itself or other objects, such as in the example below, the presence of an apple on a desk. In some embodiments the information the agent receives may refer to people or customers, or to their characteristics, such as purchasing habits, personal contact information, personal preferences, etc. In some embodiments, observations may be information about internal parts of the agent, such as without limitation proprioceptive information or other information regarding the agent's current or past actions, or information already computed or processed by the agent.

The systems and methods of the present disclosure may be useful in various applications, including for capturing the true essence of reasoning and problem solving and permitting an artificial agent to successfully perform problem solving and reasoning, within a single architecture, independently of the input language.

The present disclosure generally relates to systems and computerized methods of problem solving and reasoning that can work independently from the language and the representation model of the input. The problem solving and reasoning methods can further be extended to work with inputs given in different languages. Thus, an artificial intelligent agent, such as a toy robot, can receive input in a natural language of the child, where the artificial intelligent agent can encode this natural language input into a language-independent digitized format for execution in the architecture of the present disclosure, as discussed in greater detail below. For example, queries can be provided in English, where the support background is in Chinese, or where the query is provided in natural language and the supporting facts are in the form of an image.

The problem solving and reasoning methods can construe many problem-solving tasks, including inference (e.g., deductive, inductive or abductive), into two fundamental operations. First, a problem decomposition operation can transform the problem into a set of smaller sub-problems, for which the solution is easier to compute. Second, a solution composition operation can transform a set of solved sub-problems into the form of a solution of the problem they decompose, possibly keeping track of the solution construction, which provides the proof that the solution to the initial problem is correct.

The methods and systems provided by the present disclosure provide a technical improvement the efficiency and accuracy for problem solving and reasoning in computing devices specifically configured to perform as artificial intelligent agents. Furthermore, the methods and systems provided by the present disclosure can formulate solutions to problems within a single architecture, independently of the input language. Conventional problem-solving techniques may either not reach a solution, involving additional training of the agent, may involve more extensive computational resources to reach a solution, or may involve the problem to be presented in a specific input language. Reference now is made in detail to the details illustrated in the accompanying drawings and discussed below.

FIG. 1 is a block diagram of problem solving and reasoning architecture 100 that may be used to implement an artificial agent. Broadly stated, to solve an input problem 102 asked by a user to the agent, the input problem 102 may be provided to an encoder 122. The encoder 122 is programmed to transform the input problem 102, typically provided in a natural language domain of the user, to a language-independent form which the remainder of the architecture 100 may operate. The encoder 122 may rely on a corpus of natural language, typically stored in a memory of the agent, to understand the question asked of the user. Thus, while the encoder 122 may be language-dependent, the decomposition, matching and composition, as discussed below, are language-independent and may operate over natural language, logic, and visual objects.

The architecture 100 dynamically calls decomposition modules 104 and composition modules 106. As described in greater detail below, the decomposition modules 104 provide a series of queries that are sub-queries of the prior query, typically such that successively simpler queries are provided as one moves further down the tree of decomposition modules 104 away from an encoder 122. As described in the example below, the decomposition modules 104 provided in the tree structure may by learnt during separate training of the artificial agent, such as separate reinforcement learning as may be known in the art, or during solving the input problem 102 itself. The algorithm 100 includes two equal tree-like structures, one for the composition and one for the decomposition. A matcher 130 can be queried at each step in the decomposition to determine if there is an answer to the problem or sub-problem of any particular decomposition module 104. A dashed line indicates that no answer is available, and the problem may be decomposed into further sub-problems until a solution is found, as illustrated by the solid line from the matcher 130 and the composition module 106. FIG. 1 illustrates the decomposition as a series of conjunctions (AND) of sub-problems.

Figure 2:
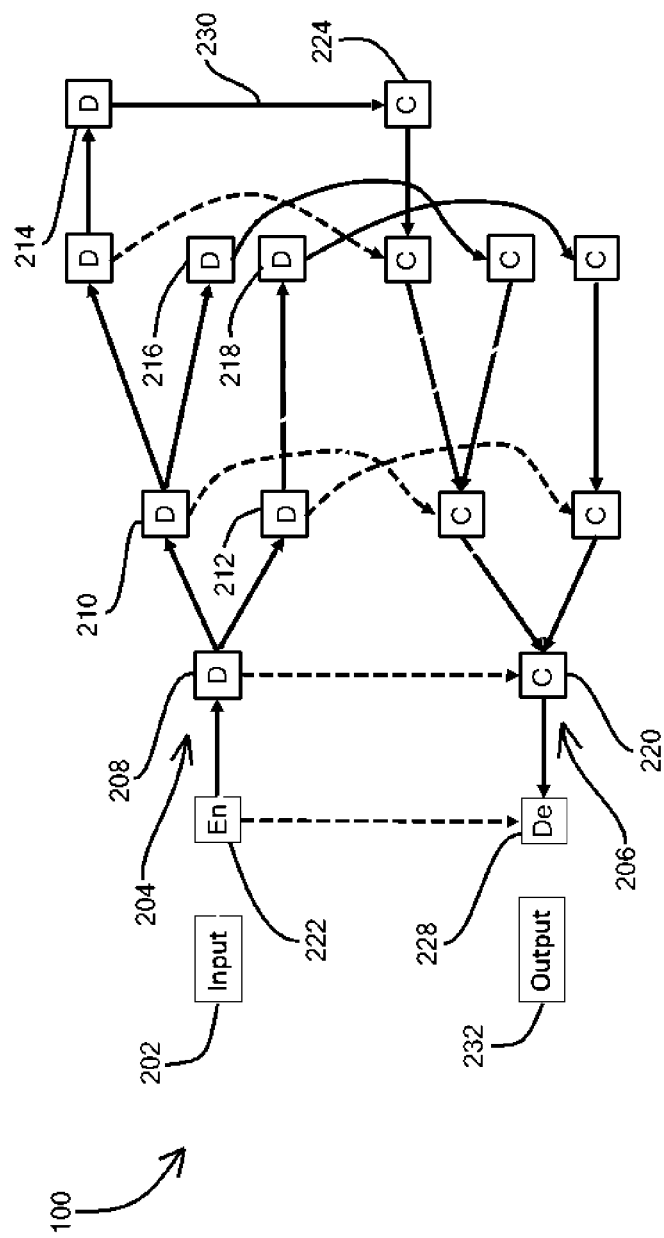
FIG. 2 is another schematic representation of a problem-solving process, showing the steps of encoding, decomposition, matching, composition and decoding the answer, consistent with an illustrative embodiment.

Referring to FIG. 2, an architecture 200 is provided to illustrate in greater detail the tree-structure that may be provided through the composition and decomposition modules. One decomposition module, such as decomposition module 208, can take the problem and output a disjunction of conjunctions of easier sub-problems, such as provided in decomposition sub-modules 210 and 212. Once the sub-problem is decomposed sufficiently to have an answer in a knowledge base of the artificial agent, as described below, then the decomposition process along that branch of the decomposition tree-structure stops. The termination of the decomposition is illustrated, for example, at decomposition sub-modules 214, 216 and 218. On the return branches, a composition sub-module, such as composition sub-module 220, can take all answers to a conjunction to produce an answer to the parent problem provided at the input 202.

The encoder 222 provides the input for the problem for the decomposition system 204. The encoder 222 may be language dependent and, therefore, separate encoders may be used depending on whether queries are provided in various languages. The encoder 222 may then provide the problem into the decomposition system 204 in a language independent format. Accordingly, the decomposition and composition process may be performed to solve the problem, independent of the input language domain.

The decomposition system 204 can take the input problem, as encoded from natural language into a language-independent digitized form, and the knowledge base and output several sets of problems, effectively outputting a disjunction (OR) over several conjunctions (AND). The recursive usage of the decomposition system 104, 204 can build a tree-like structure as shown in FIGS. 1 and 2.

The matcher 230, indicated in FIG. 2 by the lines interconnecting the decomposition sub-modules with the composition sub-modules (e.g., matcher 230 interconnects decomposition sub-module 214 with composition sub-module 224), can receive a problem and, using the knowledge base of the agent, can retrieve either a single fact or a set of facts in the knowledge base that match as an answer to the input problem. Accordingly, the matcher 230 can match the problem with information in the knowledge base to reach an answer to the problem. Otherwise, the matcher can output a token representing "No Answer", as illustrated by the dashed lines between the decomposition steps and the composition modules of FIGS. 1 and 2.

The composition module 206 includes composition sub-modules, such as composition submodule 224, that have the same tree-like structure of the decomposition sub-modules of the decomposition module 104. Each composition sub-module includes two inputs—the answers to the sub-problems (either coming from the matcher or from a previous composition sub-module) and the problem that spawned these answers. Sub-composition step 220 in FIG. 2 may output an answer to the input problem to decoder 228, which can provide the answer an as output 232 to the problem in the appropriate language domain, such as in natural language.

As discussed above, the artificial agent can include a knowledge base of learned information which can be called upon for the problem-solving or sub-problem-solving steps discussed above. Various learning paradigms can be used for training the agent, as may be known in the art. Such possible learning paradigms include reinforcement learning, supervised learning, unsupervised learning, semi-supervised learning, naïve Bayes, Bayesian networks, decision trees, neural networks, fuzzy logic models, and/or probabilistic classification models.

Figure 3:
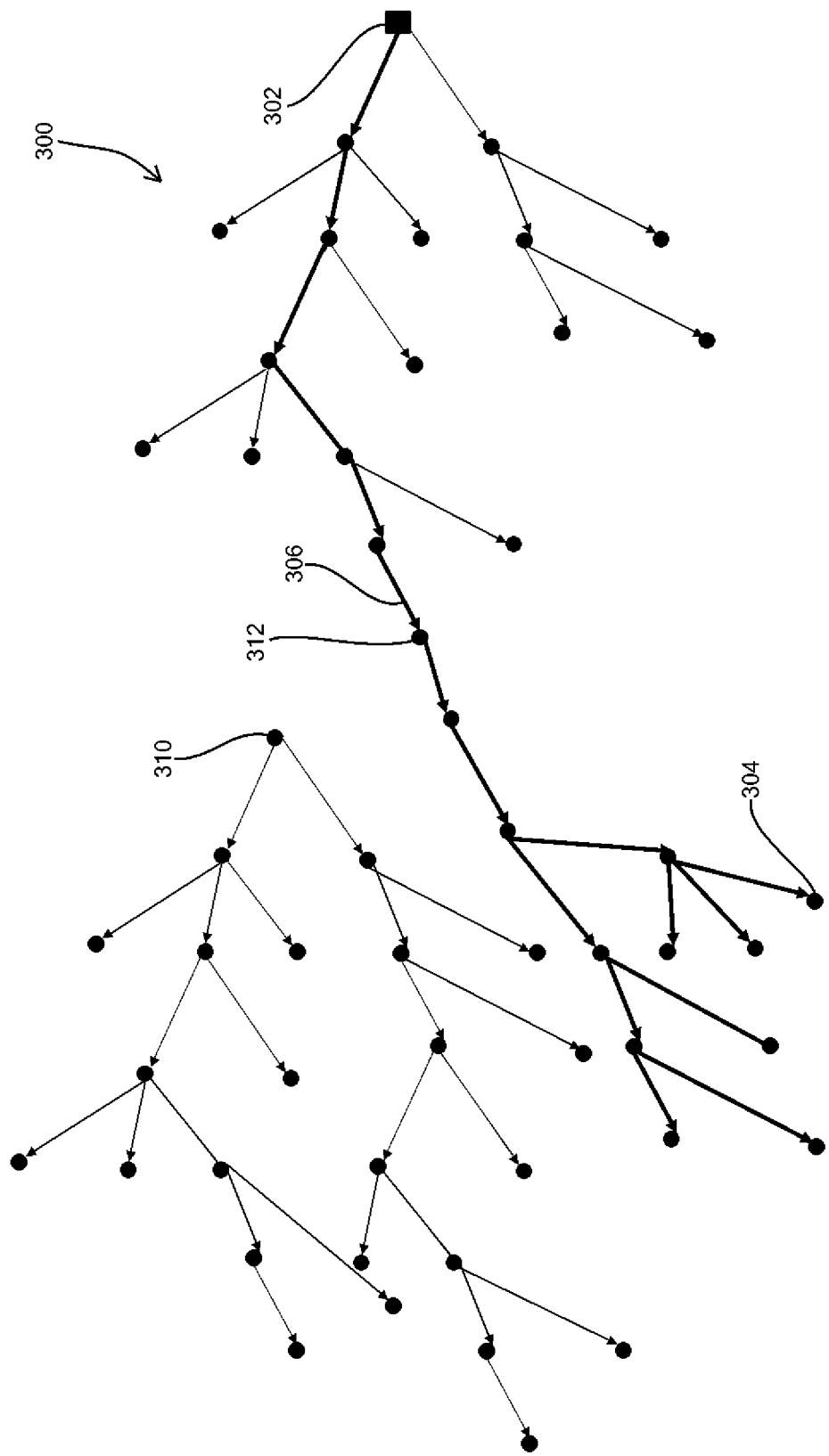
FIG. 3 is a diagram of backward and forward reasoning used for accelerating efforts to obtain an answer to a query, consistent with an illustrative embodiment.

Reference now is made to FIG. 3, which is a diagram of backward and forward reasoning used for accelerating efforts to obtain an answer to a query, consistent with an illustrative embodiment. For example, the agent can consider the proof search problem as a graph problem 300, where a source node (the query) is connected to a set of target nodes (the possible supporting facts/knowledge in the knowledge base). The closed square node 302 indicates a source node (the query), where nodes at the ends of each path, such as node 304, indicates a target node, or possible answers to the query. The darker lines 306 indicate a solution between the source node 302 and the target nodes 304. Backward reasoning from the source node 302 toward the target nodes 304, in parallel with forward reasoning from the target nodes, such as target nodes 308, toward a central tree node 310, can be used to more efficiently determine if there is an answer to a particular query. Thus, by performing the forward and backward reasoning in parallel, the resulting tree can be more readily determined and a solution to the query obtained as compared to relying solely on only one of forward reasoning or backward reasoning.

Example Process

Figure 4:
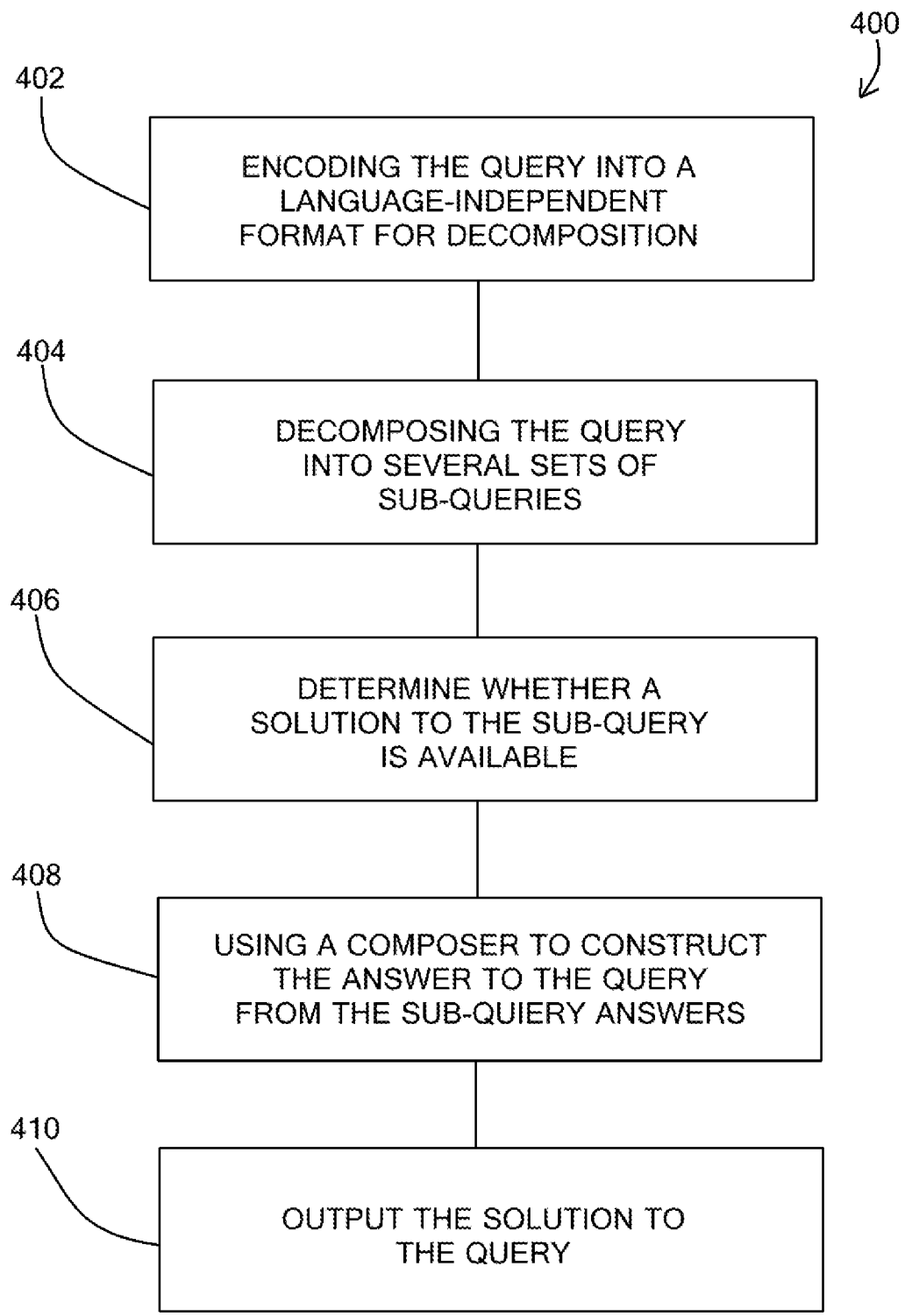
FIG. 4 is a flow chart of a problem-solving workflow, consistent with an illustrative embodiment.

With the foregoing overview of the example architecture 100 and example diagram of backward and forward reasoning used for accelerating efforts to obtain an answer to a query to a computing device, it may be helpful now to consider a high-level discussion of an example process. To that end, FIG. 4 presents an illustrative process related to a computationally efficient problem solving and reasoning of a computing device. Process 400 is illustrated as a collection of blocks, in a logical flowchart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform functions or implement abstract data types. In each process, the order in which the operations are described is not intended to be construed as a limitation, and any number of the described blocks can be combined in any order and/or performed in parallel to implement the process. For discussion purposes, the process 400 is described with reference to the architecture 100 of FIG. 1.

A first act 402 can include encoding the query into a language independent format for decomposition. At act 404, an artificial intelligence agent uses decomposition modules for decomposing a received query into several sets of sub-problems. In certain embodiments, the entire decomposition structure (embedded, for example using graph embeddings) is provided as input to a decomposition module while creating dynamically the tree-structure.

At act 406, the artificial intelligence agent uses a matcher to determine whether a solution to the sub-problem is known. Once a solution is identified, at act 408, the composer can provide answers to the sub-problems. Finally, at act 410, the decoder can then output the solution to the problem in the appropriate language domain.

Figure 5:
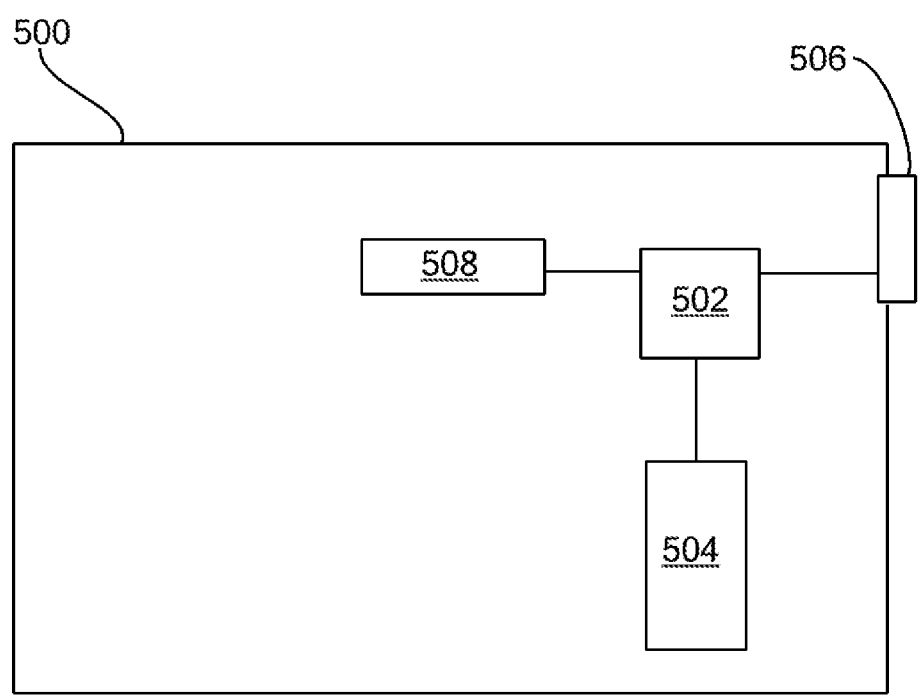
FIG. 5 illustrates a schematic representation of an artificial agent capable of operating the problem-solving processes of FIGS. 1 and 2.

FIG. 5 illustrates a general schematic representation of an artificial intelligent agent 500, showing the various components in black-box form. It should be understood that a description of an embodiment with several components in communication with each other does not imply that all such components are required. On the contrary, a variety of optional components are described to illustrate the wide variety of possible embodiments of the present system.

The agent 500 can include a processor 502 for processing program code specifically directed toward carrying out methods described herein and as discussed in greater detail above. A problem solving and reasoning engine 508 may be coupled to the processor to provide the method of the present disclosure for use by the agent 500. The agent 500 can further include memory 504 for storing knowledge. Such knowledge stored in the memory 504 may constitute the above discussed knowledge base used by the matcher. The agent 500 can further include one or more sensors 506, coupled with the processor 502, for receiving observations concerning the environment about the agent 500. Other components, as may be known in the art, such as mobility components, grasping components, and the like, may be present.

A non-limiting example regarding problem manipulators and the application of the methods and systems of the present disclosure is provided. In this example, an artificial agent is exploring a space. Background knowledge can be available to the agent based on information obtained from, for example, visual sensors. Such background information includes an observation of a room with four sides and a wall directly in front of the agent. Possible actions at this stage include go right or go left, for example. A query is provided to the agent, in natural language, asking, "Is there an apple on the desk?" This query can be decomposed into "reach the desk" AND "check if an apple is on the desk". The query "reach the desk" can be decomposed into "go around the wall". The query "go around the wall" can be decomposed into "go around obstacle", where this query may be further decomposed into "go left" AND "go straight" AND "go right". Alternatively, to illustrate the OR usage, the query "go around the wall" could be decomposed into "go around obstacle", where this query can be further decomposed into (1) "go left" AND "go straight" AND "go right" OR (2) "go right" AND "go straight" AND "go left". If the agent chooses the actions "go left" AND "go straight" AND "go right" and successfully goes around the obstacle, this knowledge may be stored in the agent's knowledge base and the matcher can find the actions to solve future "go around obstacle" queries.

The composition process can store the solution in its knowledge base, such as the results of ground actions the agent can perform. As a result of certain portions of the decomposition and composition, the agent can further learn rules. For example, the agent can learn a rule that "go around obstacle" could be solved by "go left" AND "go straight" AND "go right". Thus, the methods of the present disclosure can be used to implicitly induce rules.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. An artificial intelligent agent comprising:
   a processor;
   a problem solving and reasoning engine configured to perform acts comprising:
      receiving a query from a user;
      decomposing the query into two or more sub-queries arranged according to a tree structure;
      determining an answer to at least one of the two or more sub-queries in a knowledge base;
      further decomposing one of the two or more sub-queries when the results of one of the two or more sub-queries return with no answer;
      repeating the further decomposing of one of the two or more sub-queries until an answer is found in the knowledge base;
      receiving results of the sub-queries;
      assembling the results of the sub-queries into a query response; and
      transmitting the query response to the user.

2. The artificial intelligent agent of claim 1, wherein the query received from the user is in an input language selected from at least one of a natural language query, logic or formal syntax and visual language.

3. The artificial intelligent agent of claim 2, wherein the problem solving and reasoning engine is further configured to perform an act comprising:
   receiving a corpus of natural language into a memory of the artificial intelligent agent; and
   encoding the natural language query into a digitized query for the act of decomposing the query into two or more sub-queries.

4. The artificial intelligent agent of claim 2, wherein the query response is transmitted to the user as a natural language response.

5. The artificial intelligent agent of claim 1, wherein the act of decomposing the query into two or more sub-queries is independent of a language of the query from the user.

6. The artificial intelligent agent of claim 1, wherein the tree structure is arranged as a disjunction of conjunctions of sub-queries.

7. The artificial intelligent agent of claim 1, wherein the problem solving and reasoning engine is further configured to perform an act comprising applying forward reasoning and backward reasoning to create the tree structure.

8. The artificial intelligent agent of claim 1, wherein the problem solving and reasoning engine is further configured to perform an act comprising learning a rule based on at least a portion of the tree structure.

9. A computer implemented method comprising:
receiving a query from a user;
decomposing the query into two or more sub-queries arranged according to a tree structure;
executing an answer to at least one of the two or more sub-queries in a knowledge base;
receiving results of the two or more sub-queries;
further decomposing one of the two or more sub-queries when the results of the two or more sub-queries return with no answer;
repeating the further decomposing one of the two or more sub-queries until an answer is found in the knowledge base;
assembling the results of the sub-queries into a query response; and
transmitting the query response to the user, wherein the decomposing the query into the sub-queries, executing the sub-queries in the knowledge base, receiving results of the executed sub-queries, and composing the results of the executed one or more sub-queries are independent of a language of the query from the user.

10. The method of claim 9, wherein the query received from the user is in an input language selected from at least one of a natural language query, logic or formal syntax and visual language.

11. The method of claim 9, further comprising
receiving a corpus of natural language into a memory; and
encoding the natural language query into a digitized query for the act of decomposing the query into two or more sub-queries.

12. The method of claim 11, further comprising further decomposing a second of the two or more sub-queries when the results of the executed one of the two or more sub-queries returns with no answer.

13. The method of claim 9, further comprising applying forward reasoning and backward reasoning to create the tree structure.

14. The method of claim 9, further comprising learning a rule based on at least a portion of the tree structure.

15. A non-transitory computer readable storage medium tangibly embodying a computer readable program code having computer readable instructions that, when executed, causes a computer device to carry out a method of improving computing efficiency of a computing device for problem solving and reasoning, the method comprising:
receiving a query from a user;
decomposing the query into two or more sub-queries arranged according to a tree structure;
determining an answer to at least one of the two or more sub-queries in a knowledge base;
receiving results of the two or more sub-queries;
further decomposing one of the two or more sub-queries when the results of the executed one of the two or more sub-queries returns with no answer;
repeating the further decomposing of one of the two or more sub-queries until an answer is found in the knowledge base;
assembling the results of the two or more sub-queries into a query response; and
transmitting the query response to the user, wherein decomposing the query into one or more sub-queries, executing the one or more sub-queries in the knowledge base, receiving results of the executed one or more sub-queries and composing the results of the executed one or more sub-queries are independent of a language of the query from the user.

16. The non-transitory computer readable storage medium of claim 15, wherein the execution of the code by the processor further configures the computing device to perform an act comprising applying forward reasoning and backward reasoning to create the tree structure.

17. The non-transitory computer readable storage medium of claim 15, wherein the execution of the code by the processor further configures the computing device to perform an act comprising learning a rule based on at least a portion of the tree structure.

* * * * *